United States Patent [19]

Takeuchi

[11] Patent Number: 5,317,869
[45] Date of Patent: Jun. 7, 1994

[54] HONEYCOMB HEATER
[75] Inventor: Yukihisa Takeuchi, Aichi, Japan
[73] Assignee: Nippondenso Co., Ltd., Kariya, Japan
[21] Appl. No.: 64,787
[22] Filed: May 21, 1993

Related U.S. Application Data

[63] Continuation of Ser. No. 794,907, Nov. 20, 1991, abandoned.

[30] Foreign Application Priority Data

Nov. 30, 1990 [JP] Japan .................. 2-337182

[51] Int. Cl.⁵ .......................................... F01N 3/28
[52] U.S. Cl. ........................... 60/300; 422/174; 422/180
[58] Field of Search ................ 60/300; 422/174, 180

[56] References Cited

U.S. PATENT DOCUMENTS

| | | |
|---|---|---|
| 3,770,389 | 10/1973 | Kitzner et al. |
| 4,753,918 | 6/1988 | Cyron . |
| 4,928,485 | 5/1990 | Whittenberger ............ 60/300 |
| 4,976,929 | 12/1990 | Cornelison ............... 60/300 |
| 5,070,694 | 12/1991 | Whittenberger ........... 422/174 |

FOREIGN PATENT DOCUMENTS 2223622  9/1990  Japan .

OTHER PUBLICATIONS

SAE Recent Developments in Electrically Heated Metal Monoliths, W. A. Whittenberger et al., Feb. 26–Mar. 2, 1190, pp. 61–70.

*Primary Examiner*—Douglas Hart
*Attorney, Agent, or Firm*—Cushman, Darby & Cushman

[57] ABSTRACT

The honeycomb heater has a structure that the first corrugated heater and the second flat heater are alternately and vortically wound to make the value of the resistance of the first corrugated heater from one end to the other end equal to that of the second flat from one end to the other end. The second flat heater has a mesh shape. Consequently, the honeycomb heater of the present invention has no deformation of heaters caused by piling of corrugated heaters and has a larger area of heater per unit area.

18 Claims, 8 Drawing Sheets

HONEYCOMB HEATER

This is a continuation of application Ser. No. 07/794,907, filed on Nov. 20, 1991, which was abandoned upon the filing hereof.

BACKGROUND OF THE INVENTION

1. Field of the Invention

This invention relates to honeycomb heaters for activating a catalyst used for an automotive catalytic convertor, etc., for purifying exhaust gases.

2. Description of the Prior Art

Figure 17A:
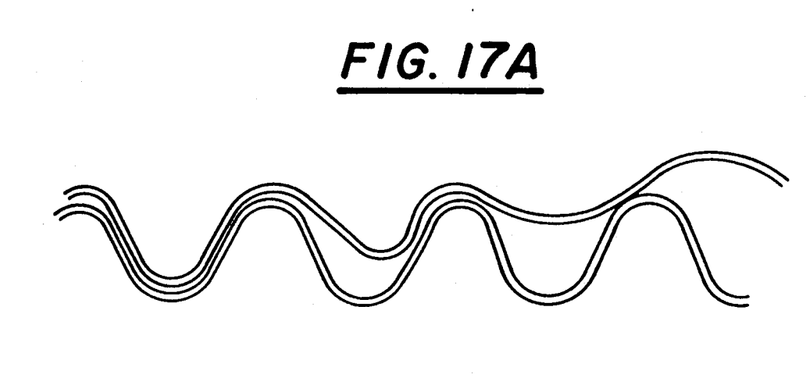
Figure 17B:
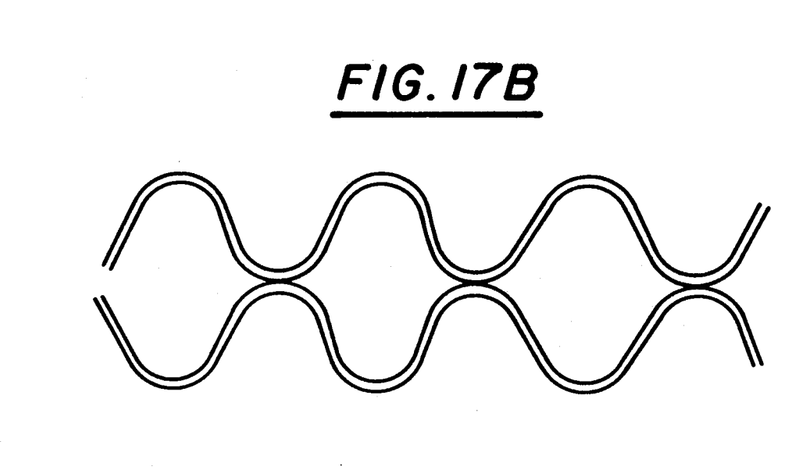

Conventionally, a heater disposed in a catalytic convertor is described in U.S. Pat. No. 3,770,389, in which a corrugated heater is wound vortically around a central electrode. In this structure, however, as a plurality of corrugated heaters are wound around the central electrode, the corrugated heaters become partly piled up on each other as shown in FIGS. 17(a) and 17(b). Consequently, at some parts of the piled corrugated heaters, deformation of the corrugations and unequal heater density per unit area respectively cause generation of unequal heat. As a countermeasure, it has been suggested that a flat heater and the corrugated heater be alternately disposed. However, since the distance of the corrugated heater between the central electrode and a case holding the periphery of the heater is longer than that of the flat heater, the value of electric resistance of the flat heater is much smaller than that of the corrugated heater. That causes unequal heat generation throughout the whole heater.

To solve the unequal heat generation problem, it has been suggested to use a thin corrugated heater or a thick flat heater which, however, causes a decline of strength of the whole heater or an increase of pressure loss. Accordingly, it is an object of the present invention to provide a honeycomb heater having no deformation of corrugated heaters caused by being piled up and having large heater area per unit area.

SUMMARY OF THE INVENTION

The present invention includes a central electrode having cylindrical shape, a plurality of first heaters having conductivity, the first heaters being corrugated heaters and electrically connected to the central electrode at one end, the first heaters being vortically wound around the central electrode, a plurality of second heaters being flat mesh heaters and having conductivity, the second heaters being electrically connected to the central electrode, vortically wound around the central electrode and wound alternately with the first heaters, the value of resistance of a second heater from its one end connected to the central electrode to the other end opposing to one end being approximately the same as the value of resistance of a first heater from its one end to the other, a casing electrically connected to the other ends of the first heaters and the second heaters and holding the first heaters and the second heaters, the first heaters and the second heaters being heated by applying voltage to the central electrode and the casing.

The honeycomb heater of the present invention adopts the structure that the corrugated first heater and the flat second heater are alternately accumulated and vortically wound around the center electrode, and the second heater employs a mesh shape in order to make the value of resistance of the second heater from its one end to the other almost equal to the value resistance of the first heater from its one end to the other. Consequently, the present invention prevents deformation of the heaters by being free from piling of corrugated heaters and achieves equal heat generation by the first heater and the second heater.

Further, the present invention sharply improves heat generation per unit area by utilizing a flat second heater.

DETAILED DESCRIPTION OF THE PREFERRED EMBODIMENTS

Figures 1, 2:
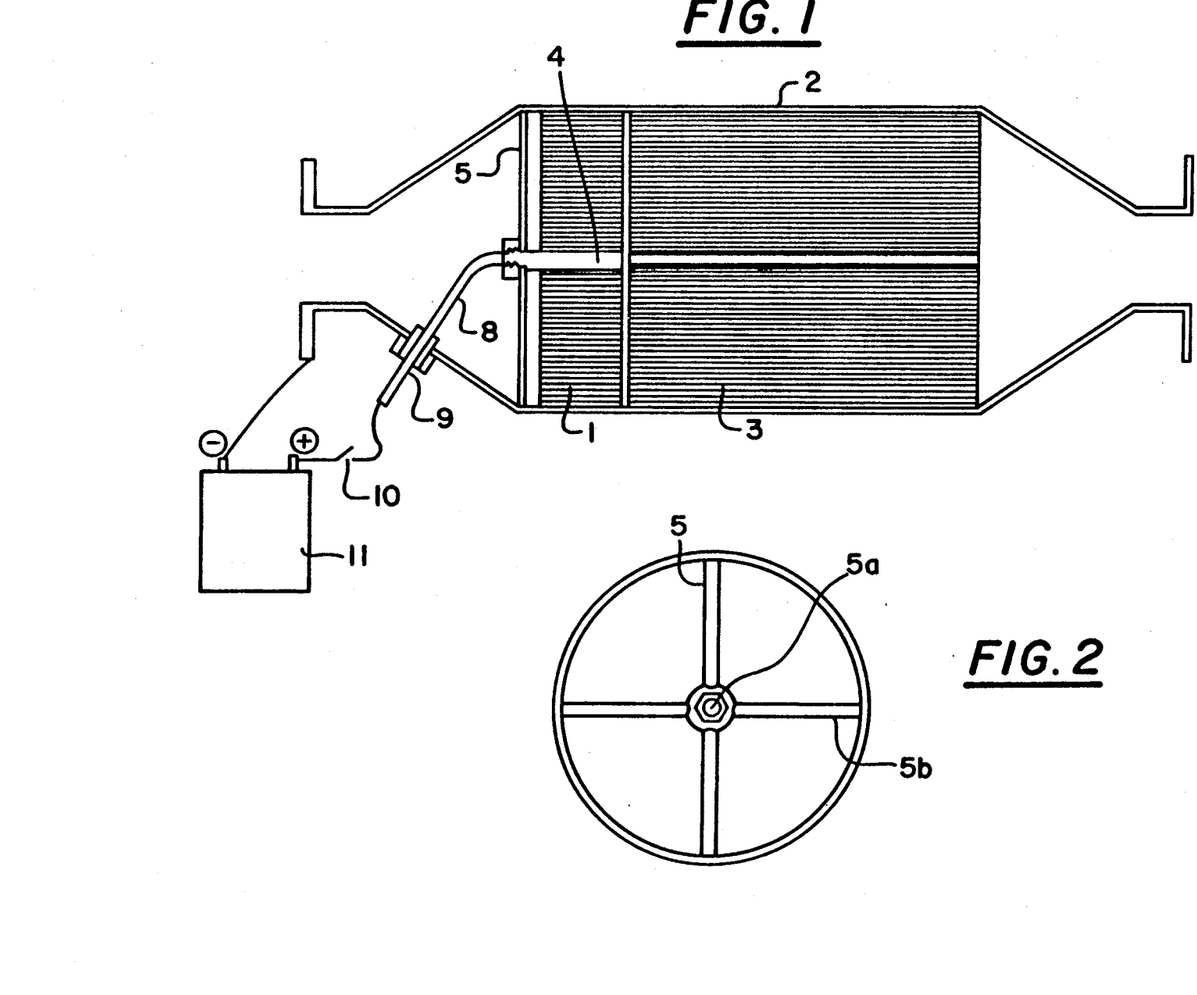
FIG. 1 shows a general view of a catalytic convertor of the present invention.
FIG. 2 shows a front view of a supporting plate of FIG. 1.

The first embodiment is explained in detail as follows. FIG. 1 shows a whole system having a catalytic convertor restores HC, CO, etc. which are exhausted from an internal combustion engine to $CO_2$, $H_2O$, etc. with a catalyst. A honeycomb heater 1 as shown in FIG. 1 is disposed at the upstream end of the catalytic carrier to cause a catalytic action to act rapidly.

The honeycomb heater 1 has a diameter of 80 mm and a length of 30 mm. A casing 2 supports the honeycomb heater 1. A catalytic carrier 3 disposed downstream of the honeycomb heater 1 purifies exhaust gases. The catalytic carrier has a diameter of 80 mm and length of 75 mm. A central electrode 4 disposed at the center of the honeycomb heater 1 has a cylindrical shape. The electrode 4 is made of Fe—Cr—Al— Rare-Earth Material (REM). Voltage is impressed to the honeycomb heater 1 through the central electrode 4 and the casing 2 so that the honeycomb heater 1 generates heat. A supporting plate 5 made of Fe—Cr—Al—REM supports the central electrode 4 around the center of the casing 2.

Figure 3:
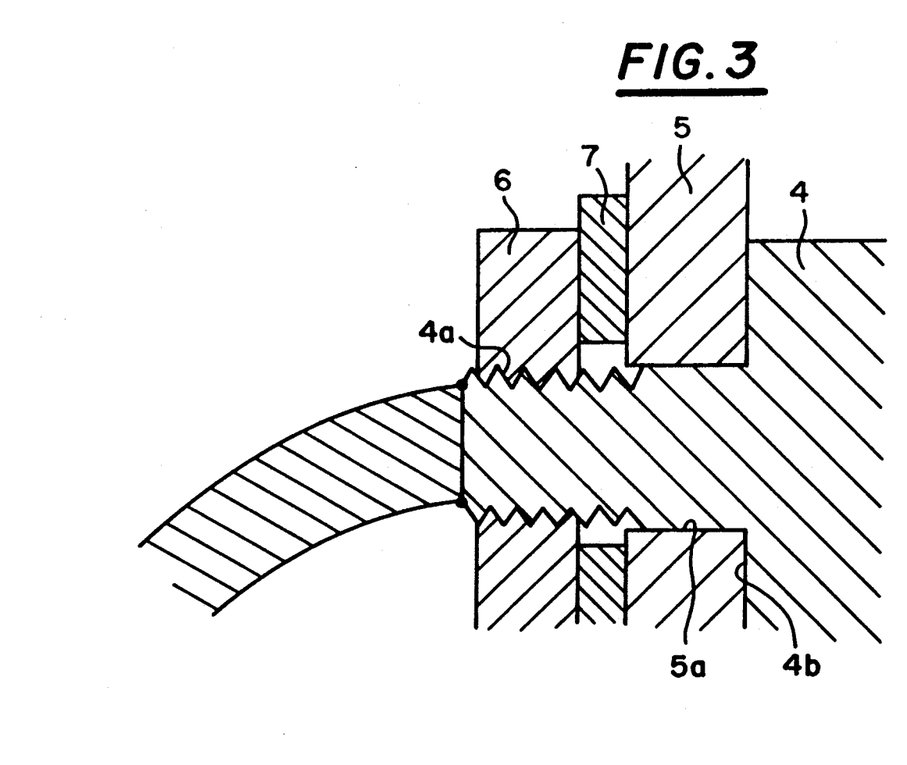
FIG. 3 is a partially enlarged cross sectional view of the supporting plate.
Figure 4:
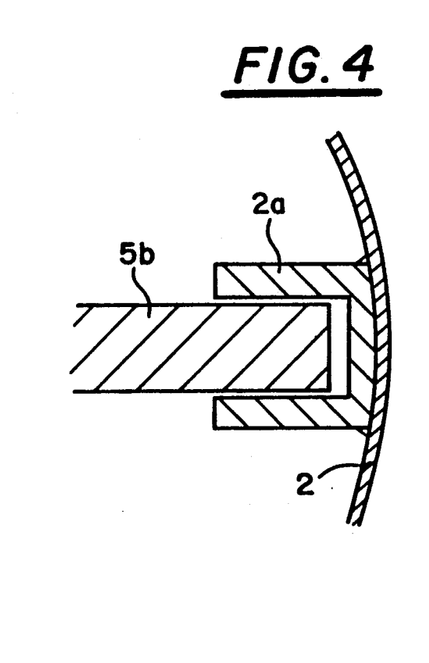
FIG. 4 is a partially enlarged cross sectional view of a holding part holding the support plate and a casing.

In FIG. 2, the supporting plate 5 has a hole 5a at its center and four legs 5b. The central electrode 4 is fixed by the hole 5a. The legs 5b spread to the four quarters and are fixed to the casing 2 by holders 2a. The central electrode 4 has a screw portion 4a at one end. The screw portion 4a is inserted into the hole 5a as shown in FIG. 3. A screw member 6 made of Fe—Cr—Al—REM and a step portion 4b sandwich tightly the supporting plate 5 through a spacer 7 made of Fe—Cr—Al—REM so that the central electrode 4 is fixed to the supporting plate 5. The supporting plate 5 is fixed to the casing 2 with the holder 2a as shown in FIG. 4. The holder 2a is fixed to the casing 2 by the method of, e.g., soldering and has a cavity into which leg 5b is inserted. Between the bottom of the cavity of the holder 2a and the leg 5b, there is a space absorbing expansion of the supporting plate 5 caused by heat generation of the honeycomb heater 1.

Figure 5:
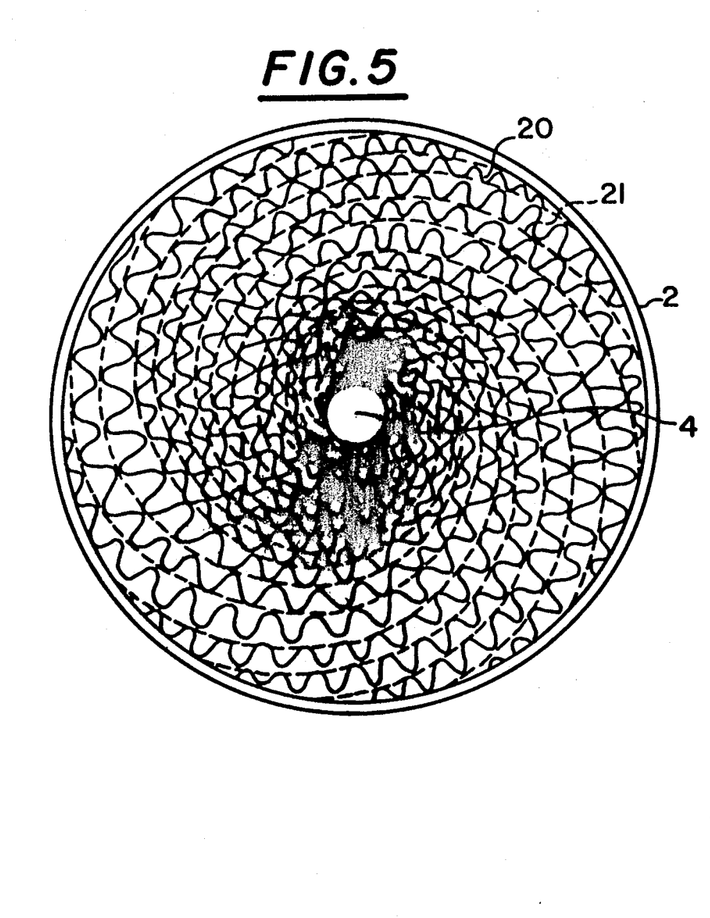
FIG. 5 shows a front view of a honeycomb heater in FIG. 1.
Figure 6:
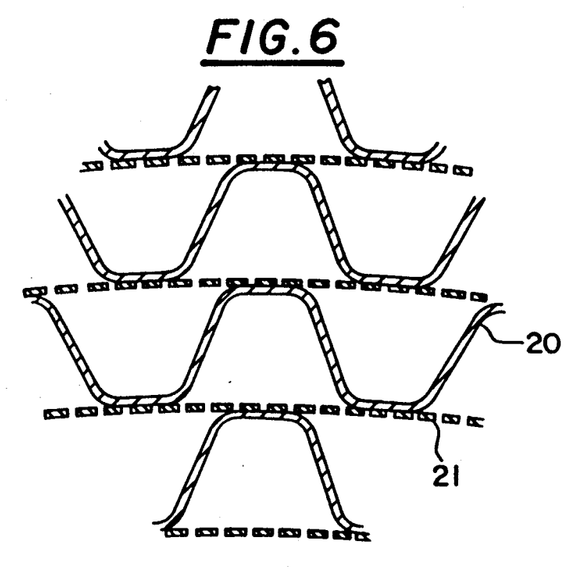
FIG. 6 is a partially enlarged view of the honeycomb heater.
Figure 7:
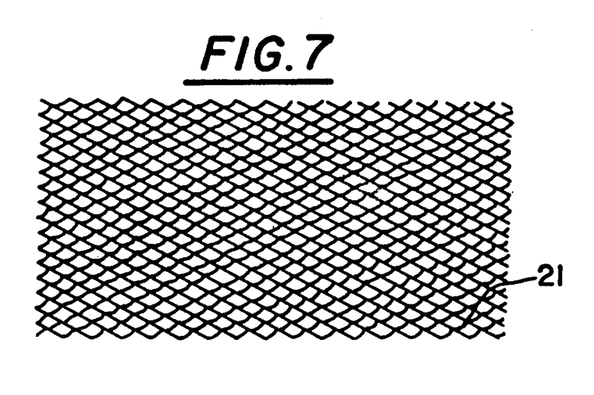
FIG. 7 shows a front view of the second heater of the present invention.

The first embodiment of the present invention in FIG. 1 is now explained. A wire 8 is connected to one end of central electrode 4 at the side of the supporting plate 5. The wire 8 is connected to an electrode of a battery 11 through a wire pocket 9 and a switch 10. The wire pocket 9 forms a hole portion made of an insulator and insulates the wire 8 from the casing 2. The other electrode of the battery is electrically connected to the casing 2 with a wire. The structure of the honeycomb heater 1 of the present invention is explained in FIGS. 5 and 6, the honeycomb heater 1 is formed of an accumulation of a plurality of the first heaters 20 alternating with a plurality of the second heaters 21 wound vortically around the central electrode 4. Each first heater 20 is a corrugated foil made of an alloy of Fe—Cr—Al consisting of Cr:18~24 wt. %, Al:4.5~5.5 wt. %, Rare—Earth—Material (REM): 0.01~0.2 wt. %, Fe: the remaining amount and extends to the axial direction of the honeycomb heater 1. Each second heater 21 is a flat plate which is processed to form a mesh shape as shown in FIGS. 7 and 8, which is made of an alloy of Fe—Cr—Al (Cr:18~24 wt. %, Al:4.5~5.5 wt. %, REM:0.01~0.2 wt. %, Fe: the remainder).

If the second heater 21 is just a flat plate (not a mesh flat plate), the actual distance of the first heater 20 between the central electrode 4 and the casing 2 is longer than that of the second heater 21 because the first heater 20 has a corrugated shape so that the value of resistance, from one end at the side of the central electrode 4 to the other end at the casing 2 of the first heater 20, is larger than that of the second heater 21. Consequently, the volume of heat generation of the second heater 21 become larger than that of the first heater 20, which causes unequal heat generation of the honeycomb heater 1.

Figure 8:
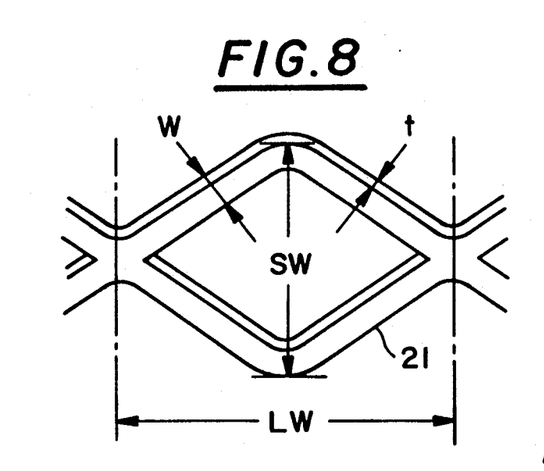
FIG. 8 is partially enlarged view of the first heater of the present invention.

Therefore, in the first embodiment, the second heater 21 is of mesh shape having the size (SW,W,t,LW,etc.) shown in FIG. 8, which causes the value of resistance between the first heater 20 and the second heater 21 to almost be equal. Consequently, when voltage is impressed on the honeycomb heater 1, the first heater 20 and the second heater 21 generate an equal volume of heat. As an example, the first heater 20 has a thickness of 0.05 mm, and a length 1 to 1.65 times the length of the second heater 21, and when the second heater 21 has a thickness of 0.05 mm, the value of resistance per unit area of the second heater 21 has a value 1 to 1.65 of that of the first heater 20 by regulating dimensions, i.e., SW,W,t and LW, of the mesh shape. In the first embodiment, the first heater 20 may have a thickness of 0.05 mm, a corrugation height of 1.25 mm and corrugation pitch of 2.5 mm, and for the second heater 21 SW may be 0.5~1.0 mm, W 1.5~2.0 mm, t 0.2 mm and LW 1.0~2.0 mm as dimensions of the mesh shape so that the value of the resistance of the first heater 20 from the central electrode 4 to the casing 2 is almost the same as that of the second heater 21.

It brings wholly equal heat generation of the honeycomb heater 1 when voltage is impressed.

The manufacturing method of the honeycomb heater 1 of the first embodiment is as follows.

Figure 9:
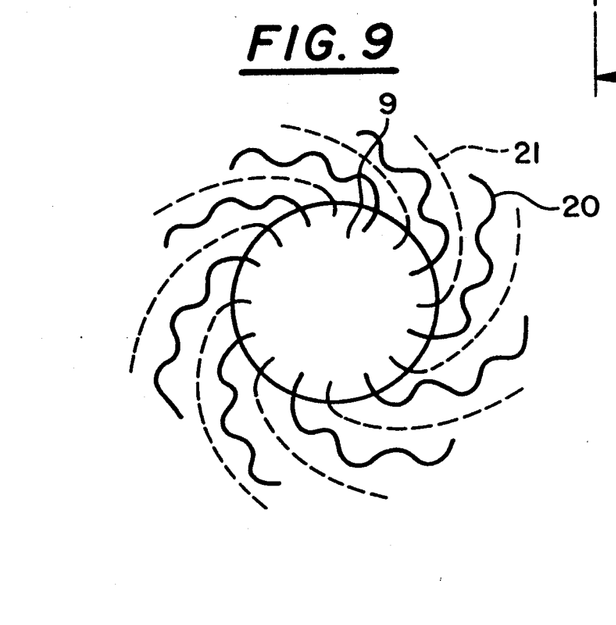
FIG. 9 is a schematic diagram explaining a manufacturing method for making a honeycomb heater of the present invention.

First, one end of each first heater 20 having Fe—Cr—Al composition and being corrugated and one end of each second heater 21 having Fe—Cr—Al composition and being flat and meshed are alternately and electrically connected to the circumference of the central electrode 4 as shown in FIG. 9. Then, the first heaters 20, and the second heaters 21 are accumulated around the central electrode 4 by rotating the central electrode 4. After that, the first heaters 20, the second heaters 21 and the casing 2 are soldered and fixed to each other. The first heaters 20 and the second heaters 21 electrically connect between the central electrode 4 and the casing 2 respectively, and need to be insulated from each other. If they are not insulated from each other, not enough heat generation is generated when voltage is impressed on the central electrode 4 and the casing 2. Therefore, in the first embodiment, each heater has a Fe—Cr—Al composition which gives electrical conductivity and provides high insulation material at the surface.

A method for making an insulator on the surface is to accumulate aluminum oxide compound on the metal surface by heating for 1~10 hours at the temperature of 800° C.~1200° C. When the insulation is not sufficient, e.g. an aqueous solution containing alumina sol is adhered on the surface of the heater and calcinated for 1~10 hours at the temperature of 800° C.~1200° C. Alumina sol becomes alumina by the calcination and alumina forms a firm film so that the insulation on the surface of the heater becomes sufficient. When a sufficient insulation cannot be attained by this method, this process may be repeated.

Then, this structure is impregnated into slurry containing $\gamma$-$Al_2O_3$ and is calcinated. After that, this structure is impregnated into an aqueous solution containing melted catalyst metal and is calcinated again.

Figure 10:
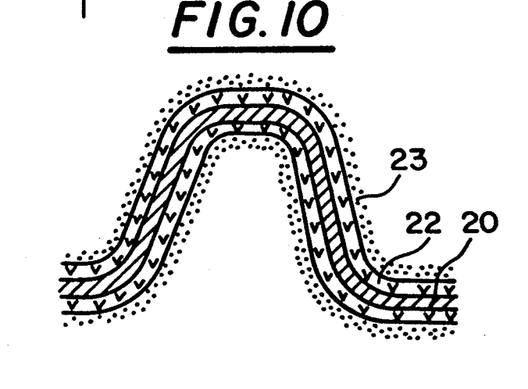
FIG. 10 shows an enlarged view of a surface of the first heater.

Consequently, as shown in FIG. 10 catalyst metal and $\gamma$-$Al_2O_3$ adhere on the surface of the first heater 20 and the second heater 21. The numerals 22 and 23 show $\gamma$-$Al_2O_3$ and catalyst metal. By the above method, the resultant honeycomb heater 1 has catalytic action.

When electric power of 10~12 V and about 400~600 A is impressed on the honeycomb heater 1 just after the engine is turned on, after 20~40 sec. (the engine being in idling condition) honeycomb heater i is heated to 300° C.~400° C. and the exhausts gases exhausted from an internal combustion engine are purified by catalytic action.

Figure 11:
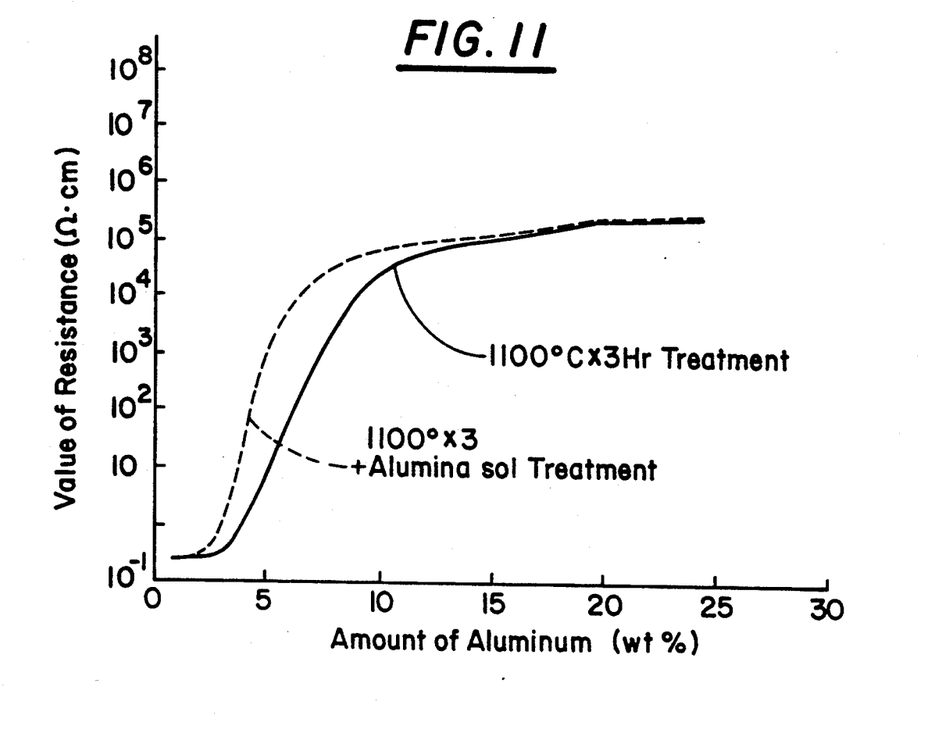
FIG. 11 is a characteristic graph showing a characteristic of Fe—Cr—Al compound metal.

The central electrode 4, the supporting plate 5, the screw member 6, the spacer 7, etc. which require conductivity are made of a composition of Fe—

Cr—Al—REM which has a characteristic as shown in FIG. 11.

FIG. 11 shows the relationship between the value of electrical resistance and the amount of aluminum in an alloy also containing Cr:18~24 wt. % and REM less than 1 wt. %. Test pieces were oxidized for 3 hours at the temperature of 1,100° C. The method of test was to measure the value of resistance of each test piece when the pressure of 10 kg/mm² is impressed on two test pieces.

As shown in FIG. 11, the alloy of Fe—Cr—Al—REM had a larger value of resistance when the volume of aluminum was increased so that sufficient insulation was achieved. To make an insulation only on the surface of the alloy, after being dipped into aluminum sol solution, the alloy is calcinated for 1~10 hours in the oxide atmosphere of 800°~1,200° C.

The relationship between the value of electrical resistance and the amount of aluminum in this case is also shown in FIG. 11. A method of forming these electric conductive members is as follows. After a molten metal is reduced to powder, that powder is processed to a predetermined shape by hot press under vacuum or inactive atmosphere at the temperature of 600°~1,000° C. and the pressure of 10°~2,000 kg/mm².

Figure 12:
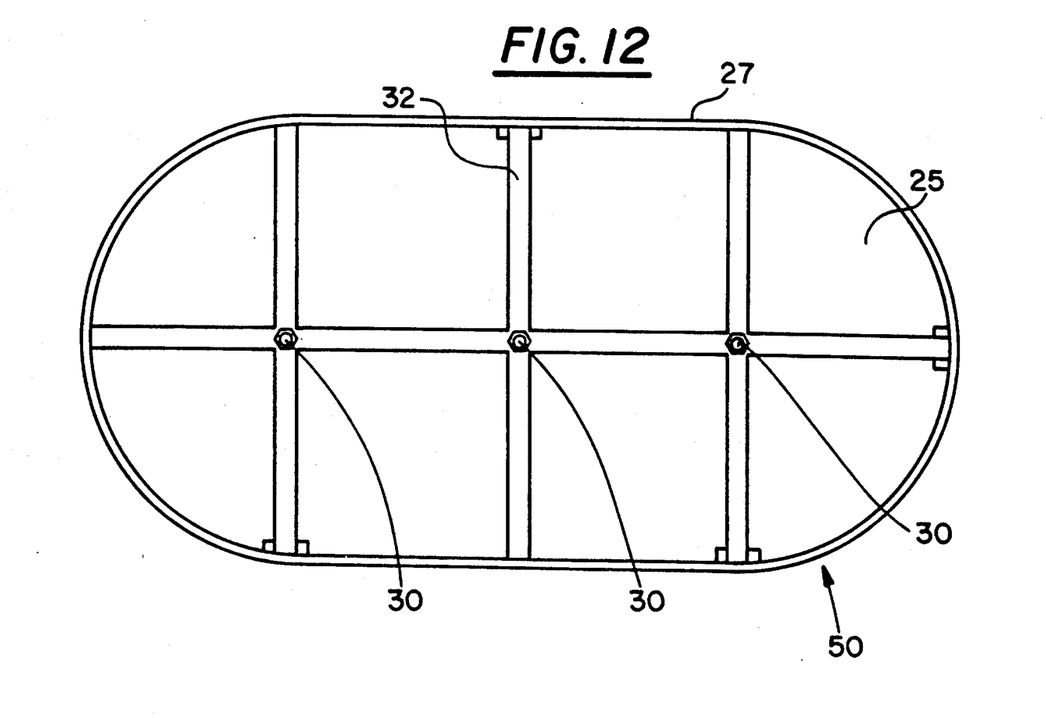
FIG. 12 shows a front view of a supporting plate of the second embodiment of the present invention.
Figure 13:
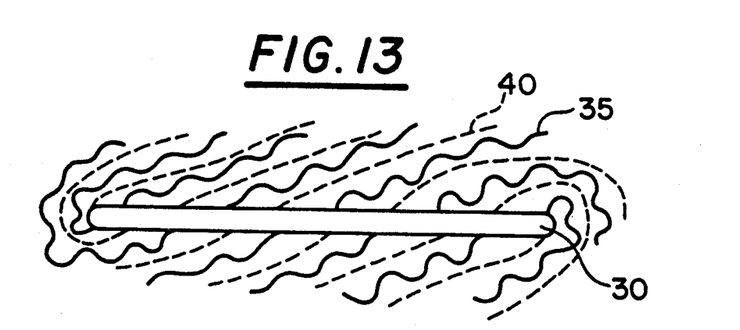
FIG. 13 is a schematic diagram explaining a manufacturing method for making the second embodiment of the present invention.

The second embodiment shown as FIG. 12 has an ellipse shape at its cross section. A honeycomb heater 25, a casing 27, a central electrode 30, a supporting leg 32, a first heater 35 and a second heater 40 are shown in FIGS. 12 and 13. In this case, a supporting plate 50 is shown in FIG. 12 and a manufacturing method of the honeycomb heater is almost the same as that of the first embodiment.

Figure 14A:
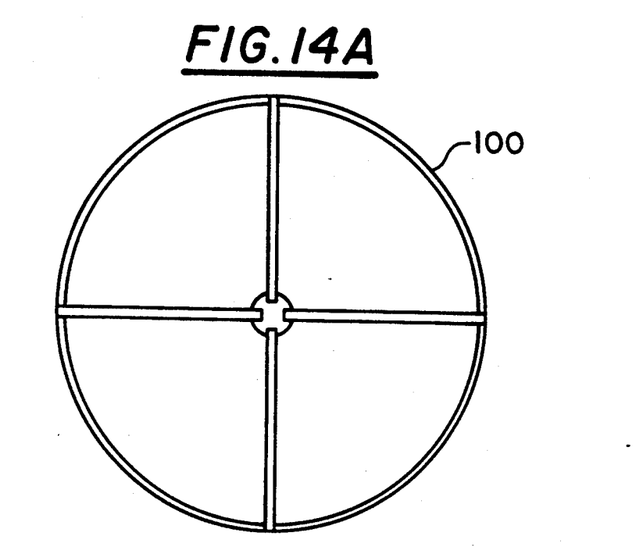
FIG. 14(a) shows a front view of a supporting plate of the third embodiment of the present invention.
Figure 14B:
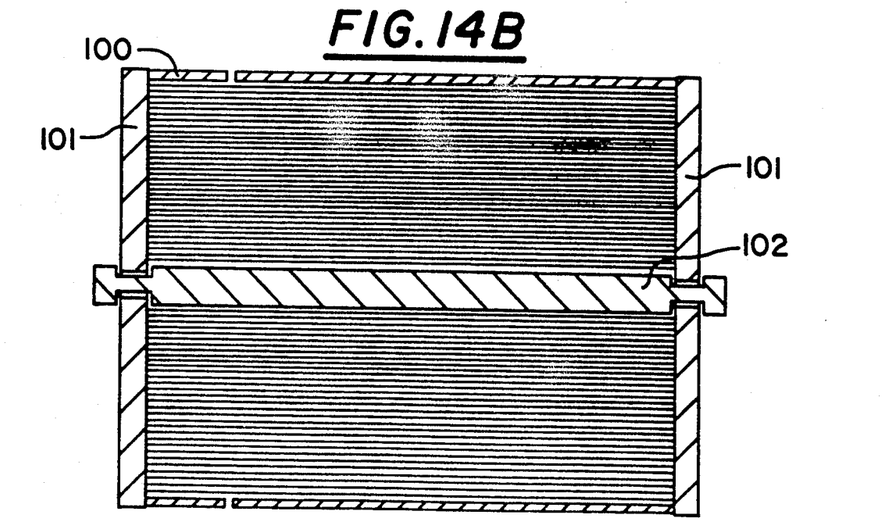
FIG. 14(b) shows a cross sectional view of the heaters of the third embodiment.

FIGS. 14(a) and 14(b) shows the third embodiment. In the first embodiment, the catalytic carrier is disposed downstream of the honeycomb heater 1. However, the third embodiment shows only a honeycomb heater. A casing 100 having conductivity is a cylindrical shape having a diameter of 80 mm and a length of 130 mm. At both ends of the casing 100, each side plate 101 forming a ground is welded. At the inside of the casing 100, there is the first heater formed by corrugated sheet made of an alloy of Fe—Cr—Al—REM and having a thickness of 0.05 mm. The corrugated sheet is vortically wound around the central electrode 102 which has a diameter of 7 mm. There is also the second heater formed by a flat mesh plate having a thickness t of 0.15 mm, SW of 1.0 mm. LW of 2.0 mm and W of 0.20 mm relative to the measurements in FIG. 8. The side plates 101 covers both ends of the casing 100 to prevent the first and the second heaters from protruding outside of the casing 100. The side plate 101 is made of an alloy of Fe—Cr—Al which is capable of forming insulation just on the surface by surface treatment and the containing volume of aluminum is 5 wt. %.

On the surface of the side plate 101, insulated treatment which is the same as one of the first embodiment is performed. The side plates 101 fix the central electrode 102 at both of its ends and prevent the electrode 102 from rotating. The side plate 101, the central electrode 102, the first heater and the second heater are respectively insulated, each other by insulation treatment.

Figure 15:
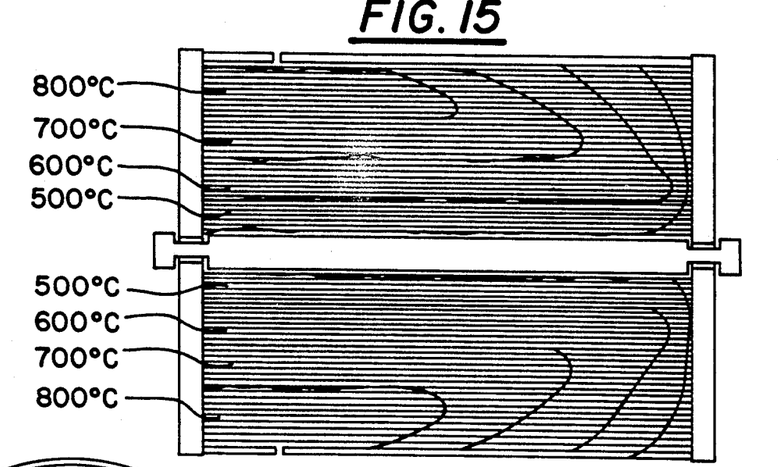
FIG. 15 shows temperature distribution of the third embodiment.

The temperature distribution of the catalytic converter of the third embodiment is shown in FIG. 15 under the condition that electric power of 10 V and 100 A was impressed for 30 sec. to the central electrode 102 and the casing 100 and there was no exhaust gas flow. As FIG. 15 shows clearly, by adopting the third embodiment the heaters and the catalyst can be united so that machinery strength is improved and the method of assembly is simpler. Further, since the temperature of the circumferential part of the honeycomb heater at the cross section can be raised, purification efficiency for exhaust gases at the part of circumferencial part can be improved so that purification ability is wholly improved.

Figure 16A:
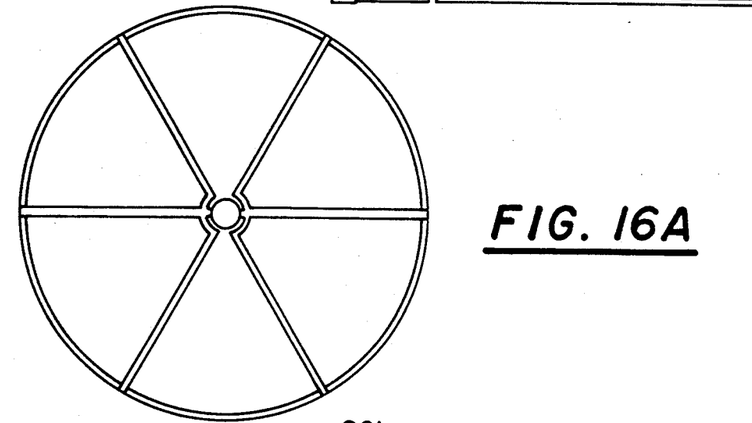
FIG. 16(a) shows a front view of a supporting plate of the fourth embodiment.
Figure 16B:
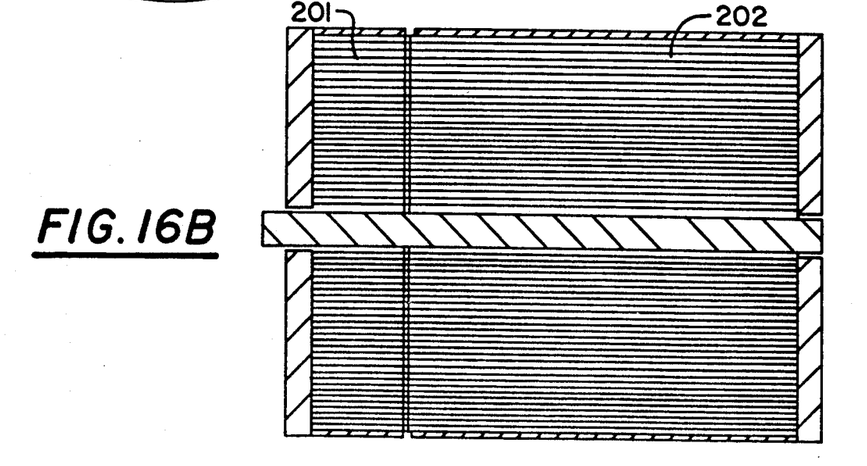
FIG. 16(b) shows a cross sectional view of the heaters of the fourth embodiment, FIGS. 17(a) and (b) show a partially enlarged views of conventional heaters.

The fourth embodiment of the present invention is shown in FIGS. 16(a) and 16(b). In the fourth embodiment, a honeycomb heater 201 and the catalytic convertor adopt the same structure so that the manufacturing process becomes simple. Further, deformation of a corrugated sheet is prevented and resistance to air flow is reduced by adopting a flat mesh sheet in comparison to a conventional catalytic carrier. Furthermore, by adopting the above structure, even the thickness of the heaters is the same for each other, equal heat generation of a whole honeycomb heater is attained.

In the above embodiments, since a flat mesh sheet is employed, the resistance to air flow in the honeycomb heater is sharply decreased. Mesh shape causes turbulence of exhaust gases passing through the honeycomb heater so that the exhaust gases contact the surface of the heater effectively. The heat exchange is effective. The weight is reduced compared with a conventional type by employing flat mesh sheets.

In the above embodiments, the second heater employs a mesh foil, however a mere plate having holes made by punching to adjust the value of resistance, an elongated metal or knitted metal to form mesh by processed wire may be employed.

In the above embodiments a method surface insulation for the first and the second heaters are not limited to the above stated method. The below method may be employed.

1. A solution of sodium hydroxide at a temperature of 400°~600° C. in which sodium oxide of 0~20 wt. % is annexed is prepared. When the first and the second heaters are dipped into this solution for 0.05~2 hours, an oxide layer is separated out on the surface of these heaters. Then, e.g. a solution containing alumina sol is adhered so that an insulation is formed on the surface of each heater by employing the same method as the above embodiments employ.

2. Aluminum is accumulated on the surface of the first and the second heaters with a thickness of 0.1~100 μm by vaporization with an electron beam or spattering, etc., or dipping into a solution of aluminum. Then alumina is accumulated on the surface of them after being heated for 0.5~10 hours in the oxidized atmosphere at a temperature of 800° C.~200° C. so that an insulation layer is formed.

When the above method does not bring sufficient insulation, a firm alumina film may be formed by calcinating for 1~10 hours in the atmosphere at a temperature of 800°~1,200° C. after being dipped into a solution of alumina sol so that an insulation on the surface of the heaters is formed.

The present invention provides an improved honeycomb heater having no deformation of heater caused by piling of corrugated heaters and having a larger area of heater per unit area.

What is claimed is:

1. A honeycomb heater for electrically heating catalytic converter comprising:
   a central electrode being electrically conductive;

a monolith structure spirally wound about said central electrode including (1) a plurality of first heaters having a plurality of corrugated metal strips of substantially equal length secured to said central electrode, and (2) a plurality of second heaters having a plurality of mesh-like metal strips having a width of substantially equal to a width of said corrugated metal strips and a length substantially equal to a length of said corrugated metal strips to make resistance value of each said second heater substantially equal to that of each said first heater, each said first heater being in alternating relation with each said second heater, said first heaters being fused to adjacent said second heaters; and a casing surrounding said spirally wound monolith structure so as to retain the structure.

2. A honeycomb heater as in claim 1 wherein said first and said second heaters are made of an alloy of Fe—Cr—Al.

3. A honeycomb heater as in claim 1 wherein said first and said second heaters are insulated respectively.

4. A honeycomb heater as in claim 1 wherein said first and said second heaters has at least a catalyst made of an alloy of $\gamma Al_2O_3$.

5. A honeycomb heater as in claim 1, further comprising means for supplying electrical power from a voltage source to said central electrode.

6. A honeycomb heater as in claim 5, further comprising means for electrically conducting said electrical power from said casing to the voltage source.

7. A honeycomb heater as in claim 5, wherein said mesh-like metal strip includes a plurality of apertures.

8. A honeycomb heater as in claim 7, wherein each said aperture has a square-shape.

9. A honeycomb heater as in claim 7, wherein each said aperture has a triangle-shape.

10. A honeycomb heater as in claim 2, wherein each said first and second heater has a layer formed of an alloy of $\gamma$-$Al_2O_3$.

11. A honeycomb heater as in claim 10, wherein each said first and second heater has a layer formed of a catalyst metal on said layer formed of an alloy of $\gamma$-$Al_2O_3$.

12. A honeycomb heater for electrically heating a catalytic converter comprising:

a central electrode being electrically conductive and being cylindrical in shape;

a plurality of first heaters having a plurality of corrugated metal strips of substantially equal length secured to said central electrode;

a plurality of second heaters having a plurality of metal strips having a width of substantially equal to a width of said corrugated metal strips and a length substantially equal to a length of said corrugated metal strips;

resistance control means disposed on each said second heater for making a resistance value of said second heater substantially equal to that of said first heater, each said first heater being in alternating relation with said second heater, said first heaters being fused to the adjacent said second heaters; and a casing surrounding and holding said first and second heaters wound around said central electrode.

13. A honeycomb heater as in claim 12 wherein said first and said second heaters being made of an alloy of Fe—Cr—Al.

14. A honeycomb heater as in claim 10, wherein said resistance control means comprises a plurality of apertures.

15. A honeycomb heater as in claim 10, wherein said resistance control means comprises an aperture.

16. A honeycomb heater as in claim 10, wherein said resistance control means comprises a mesh-like metal strip.

17. A honeycomb heater as in claim 10, further comprising resistance control means for making a resistance value of said second heater substantially equal to that of said first heater.

18. A honeycomb heater as in claim 17, wherein said resistance control means comprises a mesh-like metal strip.

* * * * *